US007023857B1

(12) United States Patent
Chiussi et al.

(10) Patent No.: US 7,023,857 B1
(45) Date of Patent: Apr. 4, 2006

(54) METHOD AND APPARATUS OF FEEDBACK CONTROL IN A MULTI-STAGE SWITCHING SYSTEM

(75) Inventors: Fabio M Chiussi, Long Branch, NJ (US); Andrea Francini, Eatontown, NJ (US); Denis Andreyevich Khotimsky, Belford, NJ (US); Santosh Krishnan, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 855 days.

(21) Appl. No.: 09/660,025

(22) Filed: Sep. 12, 2000

(51) Int. Cl.
*H04L 12/28* (2006.01)
*H04L 12/56* (2006.01)

(52) U.S. Cl. ............... 370/395.4; 370/236; 370/412; 370/418; 370/395.42; 710/52; 710/53; 710/54; 710/56; 710/58; 710/60

(58) Field of Classification Search ............... 370/229, 370/230, 230.1–236, 535, 537, 412, 428, 370/429, 395.4, 395.41–395.43, 253, 417, 370/418; 710/52, 53, 54, 56, 58, 60
See application file for complete search history.

(56) References Cited

U.S. PATENT DOCUMENTS

| 5,629,928 | A | * | 5/1997 | Calvignac et al. | ........... 370/237 |
| 5,787,071 | A | * | 7/1998 | Basso et al. | ................. 370/231 |
| 6,075,772 | A | * | 6/2000 | Brown et al. | ................. 370/235 |
| 6,188,674 | B1 | * | 2/2001 | Chen et al. | ................... 370/252 |
| 6,324,165 | B1 | * | 11/2001 | Fan et al. | ..................... 370/232 |
| 6,408,005 | B1 | * | 6/2002 | Fan et al. | ..................... 370/412 |

OTHER PUBLICATIONS

F. M. Chiussi et al, "Low-Cost Scalable Switching Solution for Broadband Networking: The ATLANTA Architecture and Chipset", *IEEE Communications Magazine*, Dec. 1997, pp 44-53.
F. M. Chiussi et al, "Backpressure In Shared-Memory-Based ATM Switches Under Multiplexed Bursty Sources", *Proc. IEEE INFOCOM '96—Networking The Next Generation*, vol. 2, pp 830-843, San Francisco, CA, Mar. 1996.
D. C. Stephens et al, "Implementing Distributed Packet Fair Queueing In A Scalable Switch Architecture", *Proc. IEEE INFOCOM '98—Gateway to the 21$^{st}$ Century*, vol. 1, pp 282-290, San Francisco, CA, Mar./Apr. 1998.

(Continued)

*Primary Examiner*—Wellington Chin
*Assistant Examiner*—Raj Jain

(57) ABSTRACT

The present invention focuses on the aggregation of flows belonging to different classes of non-guaranteed-delay traffic into a single FIFO queue in a downstream stage of the multi-stage switch. These include the guaranteed flows requiring bandwidth reservation, the best-effort flows that require a fair share of the excess bandwidth, and the flows that require both types of guarantee. We disclose a credit-based backpressure scheme which selectively controls the traffic originating from the previous stage of the system while achieving the goal of meeting the requirements of the individual flows. The credit function is maintained for each controlled traffic component in the aggregate session, and its objective is to balance the actual arrival rate of the component with the service rate dynamically granted by the downstream scheduler. The number of flows that can be aggregated is related to the complexity of maintaining the credit functions for the different traffic components.

14 Claims, 8 Drawing Sheets

OTHER PUBLICATIONS

F. M. Chiussi et al, "Virtual Queueing Techniques for ABR Service: Improving ABR/VBR Interaction", *Proc. IEEE INFOCOM '97—Driving The Information Revolution,* vol. 1, pp. 406-418, Kobe, Japan, Apr. 1997.

F. Toutain, "Decoupled Generalized Processor Sharing: A Fair Queuing Principle for Adaptive Multimedia Applications", *Proc. IEEE INFOCOM '98—Gateway to the 21st Century,* vol. 1, pp 291-298 San Francisco, CA, Mar./Apr. 1998.

A. K. Parekh et al, "A Generalized Processor Sharing Approach to Flow Control in Integrated Services Networks: The Single-Node Case", *IEEE/ACM Transactions on Networking,* vol. 1, No. 3, Jun. 1993, pp 344-357.

* cited by examiner

METHOD AND APPARATUS OF FEEDBACK CONTROL IN A MULTI-STAGE SWITCHING SYSTEM

FIELD OF THE INVENTION

This invention relates generally to the filed of communication and switching systems and in particular, to a method of selective feedback control in multi-module multi-stage packet switches.

BACKGROUND OF THE INVENTION

As the demand for aggregate switching capacity increases, multiple-module switching systems are being adopted as a scalable alternative to a single-node output-buffered switch (see, for example, F. M. Chiussi, J. G. Kneuer, and Kumar V. P., "Low-cost scalable switching solutions for broadband networking: The ATLANTA architecture and chipset", IEEE Communications Magazine, 35(12):44–53, December 1997.) At the same time, a significant amount of effort has been spent in designing complex scheduling algorithms which provide diversified Quality of Service (QoS) guarantees such as bounded delay, guaranteed bandwidth and fairness to individual flows or virtual connections. However, most of these techniques regulate access to a single contention point, and hence are directly applicable to output-buffered switches and multiplexors. Such a model does not adequately represent many of the evolved switch architectures, which employ multiple stages such as the ingress port, switch fabric and egress port and have contention points associated with each stage.

Feedback control through the mechanism of selective backpressure is well known in the context of multi-stage switches. However, the prior work in this field has concentrated primarily on increasing the throughput of the switching system. In one such instance such as that described by F. M. Chiussi, Y. Xia and V. P. Kumar in an article entitled "Backpressure In Shared-Memory Based ATM Switches Under Multiplexed Bursty Sources", which apprered in Proc. IEEE INFOCOM' 96—Networking the Next Generation, Volume 2, pp 830–843, San Francisco, Calif., March 1996, whenever congestion occurs at an output link of the second stage, the first stage modules are pre-empted from sending traffic to that link by means of a per-output backpressure signal. Conceptually, it is possible to extend this idea by employing per-flow schedulers in each stage and using per-flow backpressure signals. However, such a replication of functionality in all the stages defeats the purpose of building multi-stage switches, not to mention the increased implementation complexity. Hence, we are motivated to build a system in which we relegate all the fine grain scheduling details to the slower (in terms of aggregate switching capacity) first stage, aggregate a set of flows into a single session in the second stage, and provide an intelligent feedback mechanism that enables to maintain the QoS guarantees at the per-flow level. Some of the recent work done by D. C. Stephens and H. Zhang and presented as a paper entitled "Implementing Distributed Packet Fair Queueing in a Scalable Switch Architecture", which appeared in Proc. IEEE INFOCOM'98—Gateway to the 21$^{st}$ Century, Volume 1, pp. 282–290, San Francisco, Calif., March/April 1998, in multi-stage switches take a similar approach but do not address the issue of flow aggregation.

Employing queue length as an indication of congestion with asserting selective feedback with direct or indirect means is a well-known technique both in switching architectures and the Available Bit Rate (ABR) service. Use of the length of a fictitious, or virtual, queue instead of the length of an actual queue for that purpose has also been described before (See, for example, F. M. Chiussi, Y. Xia and V. P. Kumar, "Virtual Queueing Techniques for ABR Service: Improving ABR/VBR Interaction, Proc. IEEE INFOCOM'97—Driving the Information Revolution, Volume 1, pp 406–418, Kobe, Japan, April 1997. The latter method provides a reliable indication of congestion caused by a specific traffic component (ABR type traffic) in the presence of other traffic components (Variable Bit Rate, or VBR, type traffic) when each traffic component is allocated its separate queue and the ABR queue is given strictly lower priority than the VBR queue. The length of a virtual ABR queue is controlled using the reference static ABR service rate and the derived actual arrival rate.

SUMMARY OF THE INVENTION

The invention presents a method and an apparatus to assert selective feedback from a downstream stage to an upstream stage in a multi-stage switching system carrying traffic flows associated with multiple traffic components each of which is characterized by the specific Quality of Service (QoS) requirements. While the upstream stage of the system implements fine granularity queuing and a sophisticated scheduling discipline, the downstream stage allows the traffic flows of different components to be aggregated within the same queue associated with a specific pair of the input and output ports of the downstream stage. The selective backpressure is asserted for the individual traffic components based on the value of the per-component credit function (credit counter) that is incremented with the service attributed by the downstream scheduler to the specific traffic component and is decremented on arrival of a packet belonging to that component from the upstream stage. If an aggregate downstream stage queue drains completely, the credit functions of all traffic components carried by that queue are reset to their respective maximum values. The per-component backpressure is asserted when the credit function reaches or falls below zero.

The disclosed credit-based backpressure mechanism provides a reliable means for per-class congestion indication in a multi-stage switching systems. It distinguishes itself from the prior art in that:
- it uses the concept of service credit rather than actual or virtual queue length;
- it provides an indication of congestion for multiple traffic components at the same time;
- it controls the per-component credit counter using the actual services attributed to the given component by the downstream stage scheduler and the actual component arrival rate; it contains provisions to guarantee efficient redistribution of resources to the active traffic components in the case when one or more components underutilize their allocated share of resources; and
- it employs a single aggregate queue for all traffic components in a downstream stage of the system, while relying on the upstream stage scheduler to control the composition of that aggregate queue.

BRIEF DESCRIPTION OF THE DRAWINGS

The features and advantages of the present invention will become more readily apparent from the following detailed description of the invention in which.

DETAILED DESCRIPTION OF THE INVENTION

Figure 1:
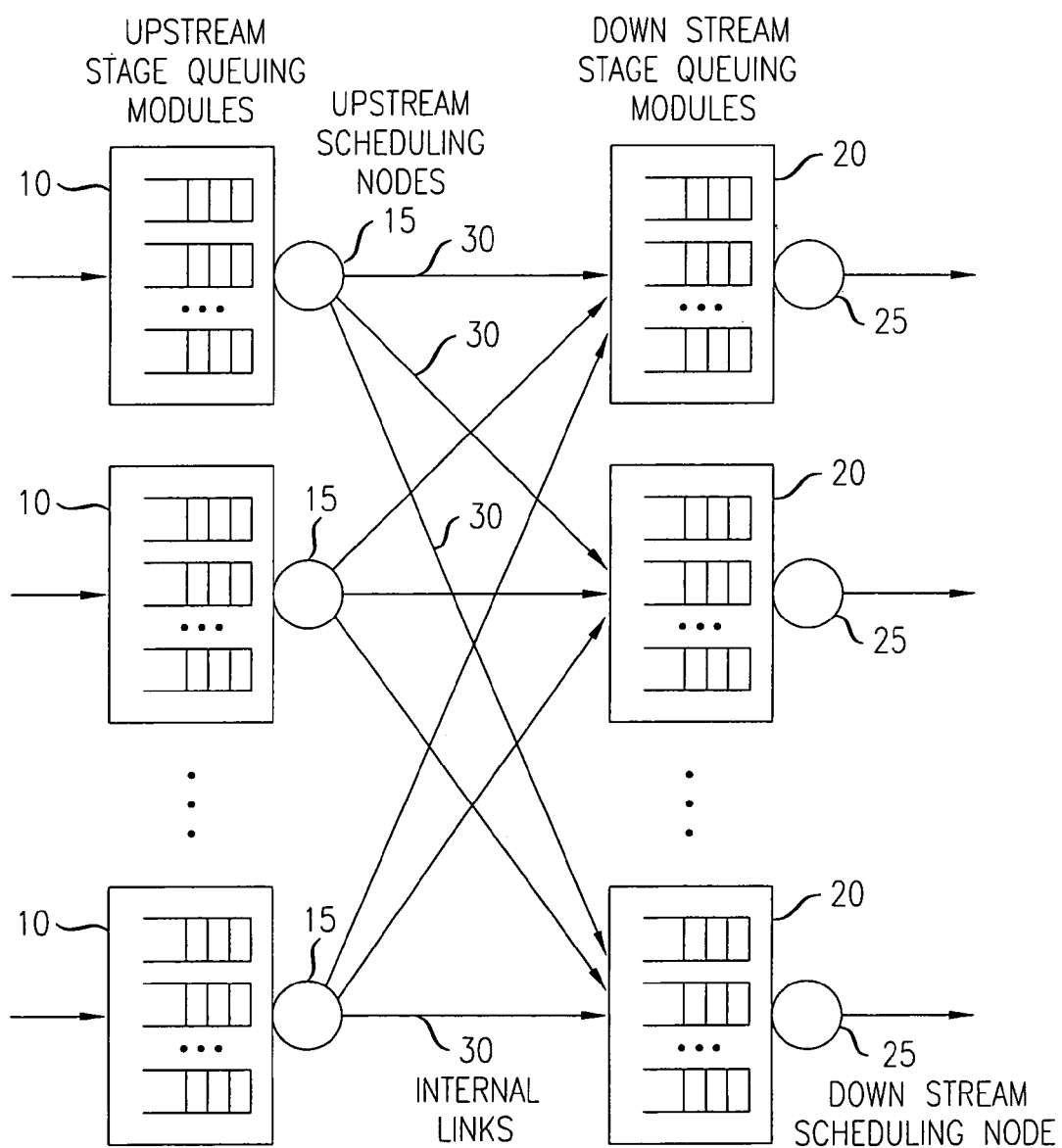
FIG. 1 illustrates the structural components of a representative multi-stage system.

With reference now to FIG. 1, there is shown a general view of selected two adjacent stages in a multi-stage switching system. Upstream-stage queuing modules 10 are interconnected by internal links 30 to downstream-stage queuing modules 20. The system switches flows, i.e., abstract end-to-end traffic streams. Upstream scheduling nodes 15 and the downstream scheduling nodes 25 arbitrate access of the switched flows to the link bandwidth. Each of the upstream stage scheduling nodes 15 services a set of per-flow queues, which may be organized in a hierarchical structure, and feeds a set of the second stage queues and associated scheduling nodes. A spatial channel is defined by a pair of upstream and downstream scheduling nodes. Traffic belonging to a certain flow competes for service bandwidth with other flows of the same spatial channel (in-channel flows) and with traffic of other spatial channels sharing the same upstream and downstream scheduling nodes (cross-traffic flows). For a given spatial channel, the upstream cross-traffic flows and the downstream cross-traffic flows constitute two mutually exclusive sets. Therefore, the contention experienced at the upstream stage by the traffic in the channel is independent of the downstream contention experienced by the flows in the same channel.

Figure 2:
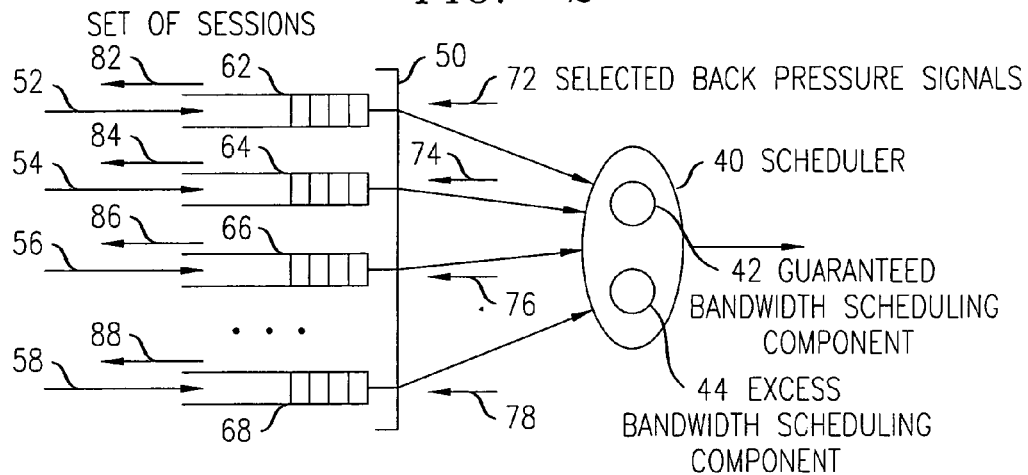
FIG. 2 illustrates a scheduling node in isolation.

A more detailed illustration of a scheduling node in isolation is presented in FIG. 2. With reference to that FIG, scheduler 40 arbitrates access to the available capacity among a set 50 of sessions 52 . . . 58, which may correspond to individual traffic flows or their aggregates. Each session 52 . . . 58 is provided an individual queue 62 . . . 68, which may store the packets before they are scheduled for transmission. Arrival rate of a session is the dynamically varying rate at which its traffic enters the system. The session is backlogged if it has traffic waiting for service in the queue. The portion of available bandwidth instantaneously provided to a session by a scheduler is referred to as granted rate of that session. The session's traffic leaves the node at the output rate. For an isolated scheduler, the output rate of each backlogged session is equal to its granted rate, unless restricted by an external backpressure signal. The selective backpressure signals 72 . . . 78 from the downstream portion of the system prevent specific session or group of session from being serviced by scheduler 40. Analogously, the selective backpressure signals 82 . . . 88 are generated for use by the upstream portion of the system. If backpressure is asserted for a specific session, the arrival rate of that session is reduced, most often to zero, within a fixed-length or variable length time interval known as backpressure latency.

In any single stage of a multistage system, scheduler 40 may implement an advanced scheduling algorithm, that provides high level Quality of Service (QoS) to its session. The QoS can be expressed in terms of bandwidth and/or delay guarantees as well as fairness. A scheduler in a packet switching system, which necessarily operates on a discrete data units, typically attempts to approximate an idealized fluid scheduling discipline used as a reference. A general scheduling reference is the Decoupled Generalized Processor Sharing (DGPS) approach, introduced in F. Toutain, "Decoupled Generalized Processor Sharing: A Fair Queueing Principle for Adaptive Multimedia Applications, Proc. IEEE INFOCOM'98—Gateway to the $21^{st}$ Century, Vol 1, pp. 291–298, San Francisco, Calif. March/April, 1998 and based on A. K. Parekh and R. G. Gallager, "A Generalized Processor Sharing Approach to Flow Control In Integrated Services Networks: The Single Node Case", IEEE/ACM Transactions on Networking, 1(3):344–357, June 1993. In DGPS each session is characterized by a reserved, or guaranteed rate $g_i$, the sum of guaranteed rates of all sessions being less than the service capacity, and excess bandwidth weight $w_i$. Let $W_i(t', t'')$ denote the amount of traffic of the i-th session served within time interval $(t', t'')$, then for any two sessions i and j that are continuously backlogged during the interval $(t', t'')$, the decoupled fairness criterion requires that:

$$\frac{W_i(t', t'') - g_i(t'' - t')}{w_i} = \frac{W_j(t', t'') - g_j(t'' - t')}{w_j}.$$

A fluid scheduler implementing DGPS is described by the following set of rules:

R1. Each backlogged session is granted at least its guaranteed rate g.

R2. For each backlogged session, the granted rate exceeds the guaranteed rate by a value proportional to weight w.

R3. For each non-backlogged session, the granted rate is equal to the lesser of its actual arrival rate and the value determined according to rules R1 and R2.

Referring to FIG. 2, a DGPS scheduler that provides decoupled fairness criterion can be conveniently represented as containing two components: the Guaranteed Bandwidth Scheduling or GBS component 42 and the Excess Bandwidth Scheduling or EBS component 44. Both components operate in parallel, the GBS component being a non-work conserving while the EBS component being work-conserving. Whenever the GBS component selects a session, this service receives service. The session selected by the EBS component receives service only if the GBS component does not make a selection.

In a two-stage system of FIG. 1, a feedback in the form of selective backpressure plays important role, when the traffic is downstream-constrained, i.e., the granted rates at the upstream stage exceed those at the downstream stage. Assuming the stationary behavior of the system which is defined by the unchanged backlog status of all flows and the constant arrival rates of the flows which are not backlogged, the selective backpressure can be modeled using the proportional reduction of rate. The throughput $R_i$ of a backlogged flow i can be found as $$R_i = \min\{\beta_i r_i^{(1)}, r_i^{(2)}\},$$

where $r_i^{(k)}$ is the flow's granted rate at the k-th stage and $\beta$ is the backpressure factor. Ideally, to ensure maximum throughput for the given flow while not imposing restrictions on the cross-traffic flow, backpressure allows to match the output rate of the upstream stage with the granted rate of the downstream stage:

$$\beta_i = \begin{cases} \frac{r_i^{(2)}}{r_i^{(1)}}, & \text{if } r_i^{(1)} > r_i^{(2)}; \\ 1, & \text{if } r_i^{(1)} \leq r_i^{(2)}. \end{cases}$$

Figure 3:
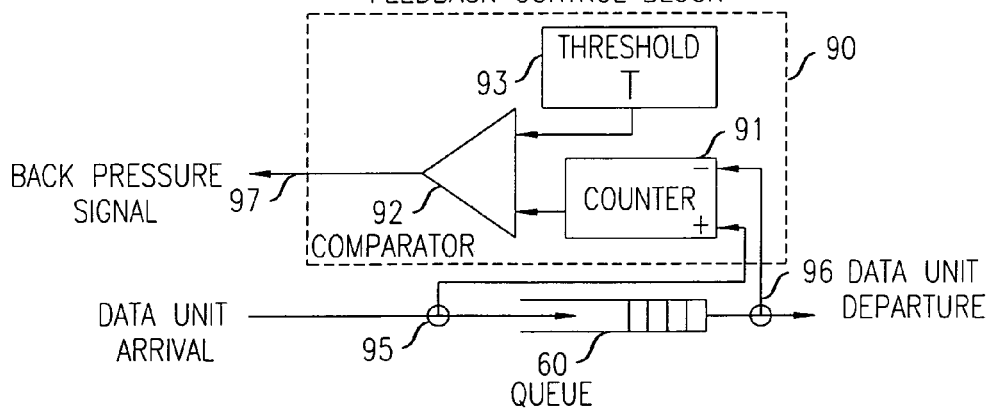
FIG. 3 illustrates a representative backpressure mechanism based on observation of queue occupancy.

The commonly used method of backpressure generation is based on the observation of the queue occupancy, as shown in FIG. 3. The feedback control block 90 contains a counter 91 and a comparator 92. The counter 91 is originally set to zero and subsequently incremented on event of a data unit arrival 95 to the queue 60 and decremented on the event of data unit departure 96 from the queue 60. The value of the counter 91, which is thus equal to the queue occupancy, is compared in the comparator 92 with threshold T which may be either or computed dynamically based on the state of the system. If the value of the counter 91 exceeds the threshold, a backpressure signal 97 is asserted towards the upstream stage. The departure from the queue occurs when the queue is not empty, and the stage scheduler selects that queue for service. Referring to FIG. 2, to ensure generation of the backpressure signals 82 . . . 88, a feedback control block 90 has to be replicated and attached to each of the queues 62 . . . 68.

Figure 4:
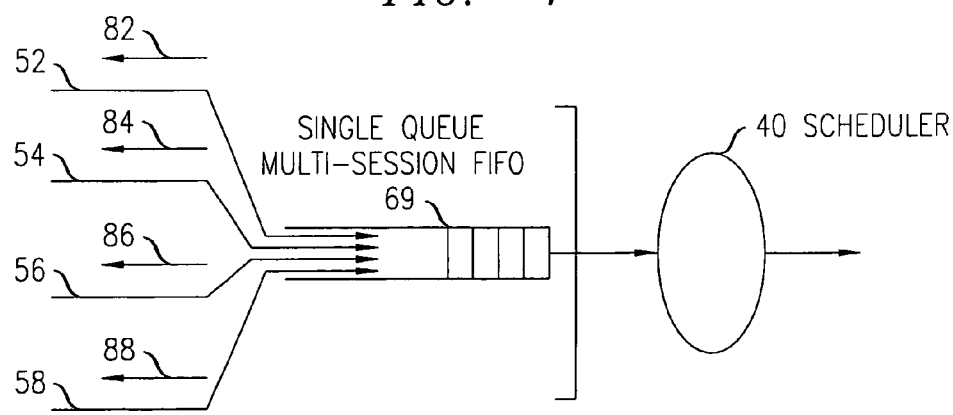
FIG. 4 illustrates an aggregation of flows in a common queue.

The disclosed invention reduces the number of queues in the downstream queuing node by aggregating queues 62 . . . 68 in a single queue multi-session FIFO queue 69, as shown in FIG. 4, provided that the individual service rates granted to each component session can be accounted for. Regardless of what component sessions within queue 69 are selected by the scheduler 40, the service is given to the data item at the head of that queue.

The method of the invention calls for assigning a value of credit function to one or more component session aggregated within the queue 69. Whenever the aggregate queue length reaches zero, the credit function of a component is initialized using a pre-computed static or state-dependent dynamic value. Subsequently, the credit function of a component is incremented when the scheduler selects that component for service, regardless of the component to which the data item at the head of the queue 69 actually belongs. The growth of the credit function is subject to truncation. The credit function of a component is decremented when a data item belonging to that component arrives to the queue. For a given session k, the value of the credit function $C_k(t)$ is reset to its maximum value $C_{k0}$ whenever the occupancy of the aggregate FIFO queue reaches and remains at zero. At other times, the credit change is governed by the following mathematical expression:

$$dC_k(t) = (r_k^{(2)}(t) - a_k^{(2)}(t)) \cdot u(C_{k0} - C_k(t)) \cdot dt,$$

where:

$$u(x) = \begin{cases} 1 & \text{if } x > 0 \\ 0 & \text{if } x \leq 0 \end{cases}$$

Here $a_k^{(2)}(t)$ and $r_k^{(2)}(t)$ are the component second stage arrival and granted rates, respectively. The backpressure signal that blocks transmission of the k-th component flow from the upstream stage is asserted whenever $C_k(t) \leq 0$.

Under the assumptions that the backpressure signals are generated continuously and take effect instantaneously, the aggregate queue length is bounded by the sum of the initial credits, and $C_k(t)$ never drops below zero. In practice, with finite backpressure sampling period and finite latency, the queue length remains bounded albeit by a larger value.

Figure 5:
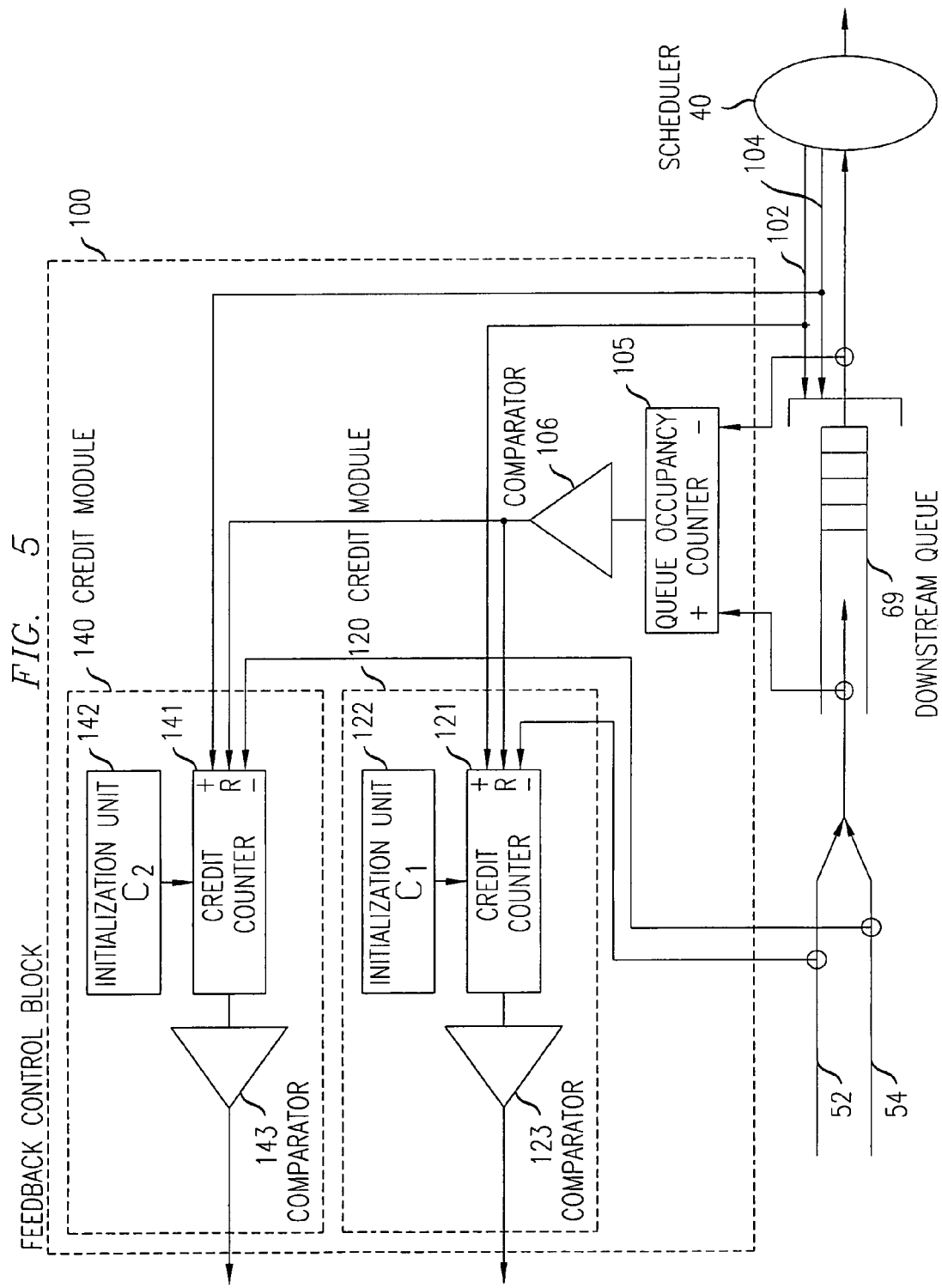
FIG. 5 illustrates a mechanism for generating credit-based feedback.

FIG. 5 shows the schematics of the backpressure generation engine implementing the disclosed feedback control method. For simplicity, it shows two component sessions, 52 and 54, aggregated in a single downstream queue 69. Whenever the scheduler 40 selects session 52 (signal 102) or session 54 (signal 104), a data item at the head of queue 69 departs the queuing stage. The feedback control block 100 contains a queue occupancy counter 105 with a comparator 106 and a set of credit modules 120, 140, one per each component session. The queue occupancy counter 105 is originally set to zero and subsequently incremented on event of a data unit arrival to the queue 69 and decremented on the event of data unit departure from the queue 69. When the queue occupancy is equal to zero, as determined by the comparator 106, a reset signal is provided to all credit modules. Each credit module 140, 120 contains a credit counter 121, 141 with a comparator 123, 143 and an initialization unit 122, 142. On receipt of a reset signal from comparator 106, the corresponding initial credit value provided by initialization units 122, 142, are written to credit counters 121, 141. When the value of the queue occupancy counter 105 differs from zero, the credit counters 121, 141 change values with data units arrivals from the upstream stage and services granted by the scheduler 40. For example, the credit counter 121, associated with session 52, is incremented whenever session selection signal 102 is generated by the scheduler 40, unless it is equal to the initial credit value supplied by initialization unit 122. The credit counter 121 is decremented when a data unit belonging to session 52 arrives to the queue 69 from the upstream stage. If the value of the credit counter 121 reaches or falls below zero, as determined by comparator 123, a backpressure signal for session 52 is asserted towards the upstream stage. Credit module 140, associated with session 54, operates in a similar fashion. Nothing in this description prevents an implementation following this disclosure from using counters that operate in the reversed direction.

The disclosed credit-based feedback method ensures that if all sessions remain backlogged and downstream-constrained, the backpressure mechanism achieves per-flow credit equilibrium near its zero value with the arrival rates matching corresponding granted rates and provides the target throughput of $R_i = \min\{r_i^{(1)}, r_i^{(2)}\}$ with the optimal value of the backpressure factor. If some of the flows are not backlogged or are downstream-constrained, then the service rate of the aggregate queue exceeds its stationary arrival rate and, therefore, the credit equilibrium can not be reached. The aggregate queue occupancy oscillates, periodically returning to zero and resetting the credit counters of all flows to their corresponding maximum values. Additionally, if the initial credit values for a set of sessions are statically selected in proportion to the excess bandwidth weight of the corresponding session than a common FIFO queue in a downstream stage that implements the disclosed credit-based feedback mechanism is sufficient to guarantee that the decoupled fairness criterion is met.

PREFERRED EMBODIMENTS

Figure 6:
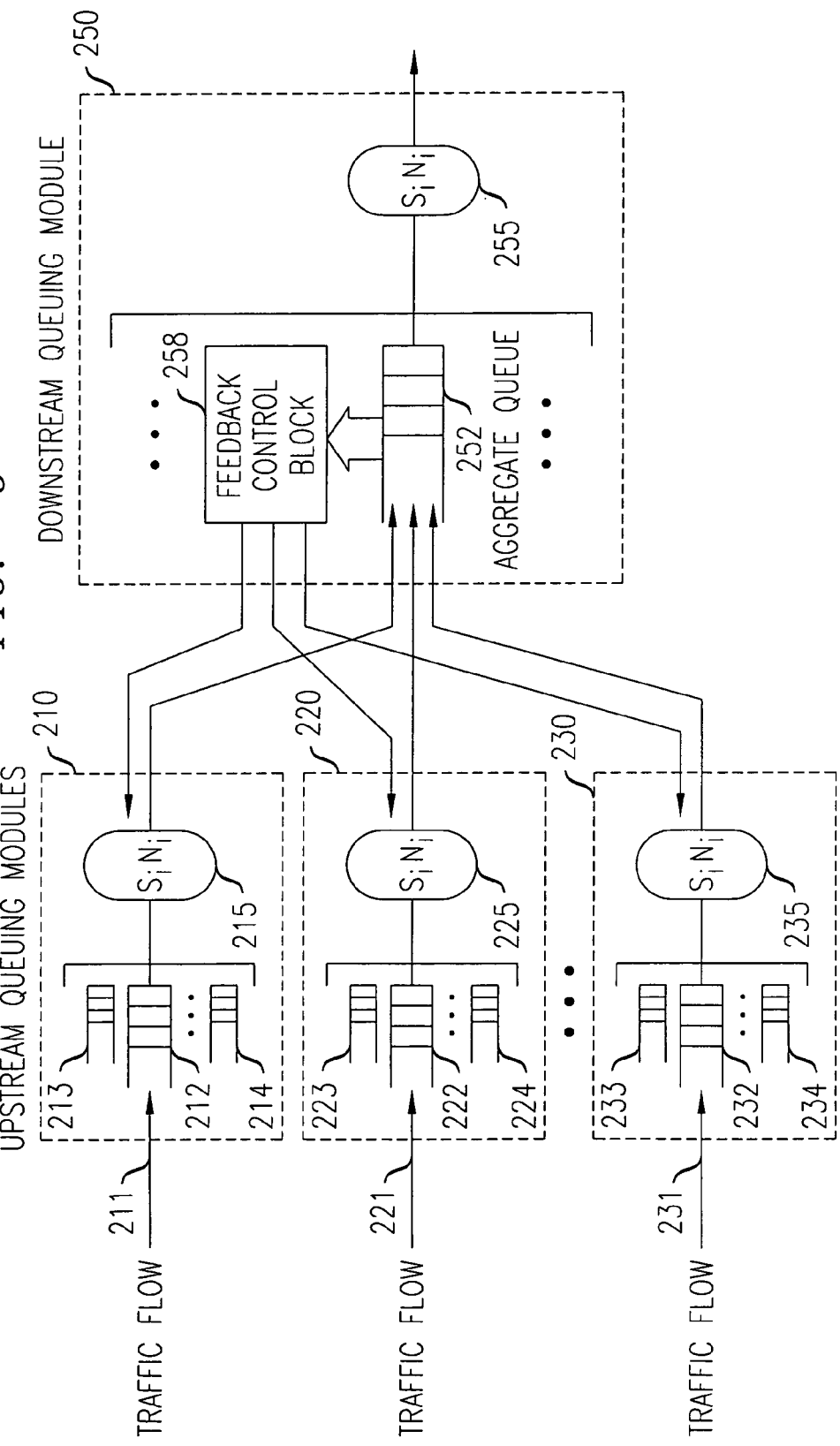
FIG. 6 illustrates a possible implementation of the credit-based feedback method in a two-stage switching system with cross-traffic flow aggregation.

One embodiment of the disclose invention provides downstream aggregation of the spatial channels traversing different upstream queuing modules, as shown in FIG. 6. For simplicity, each spatial channel is assumed to carry a single flow. Flows 211, 221, and 231 traverse upstream queuing modules 210, 220, and 230, respectively, and share downstream queuing module 250. Exemplified by upstream queuing module 210, the traffic of flow 211, which is configured as a session in the scheduling node 215, enters queue 212 serviced by that scheduler. Queues 213 and 214, also served by scheduler 215, carry cross-traffic flows traversing downstream queuing modules other than 250. In the downstream queuing module 250, the traffic flows from the different upstream modules enter the same aggregate queue 252 served by scheduler 255. The feedback control block 258 monitors the state of the queue along with its arrival and departure events and maintains the credit function in the per-flow basis using the disclosed method. The backpressure signals from the feedback control block 258 are communicated to the upstream modules 210, 220, and 230, where, when asserted, they prevent schedulers 215, 225, and 235 from selecting the corresponding sessions for service.

Figure 7:
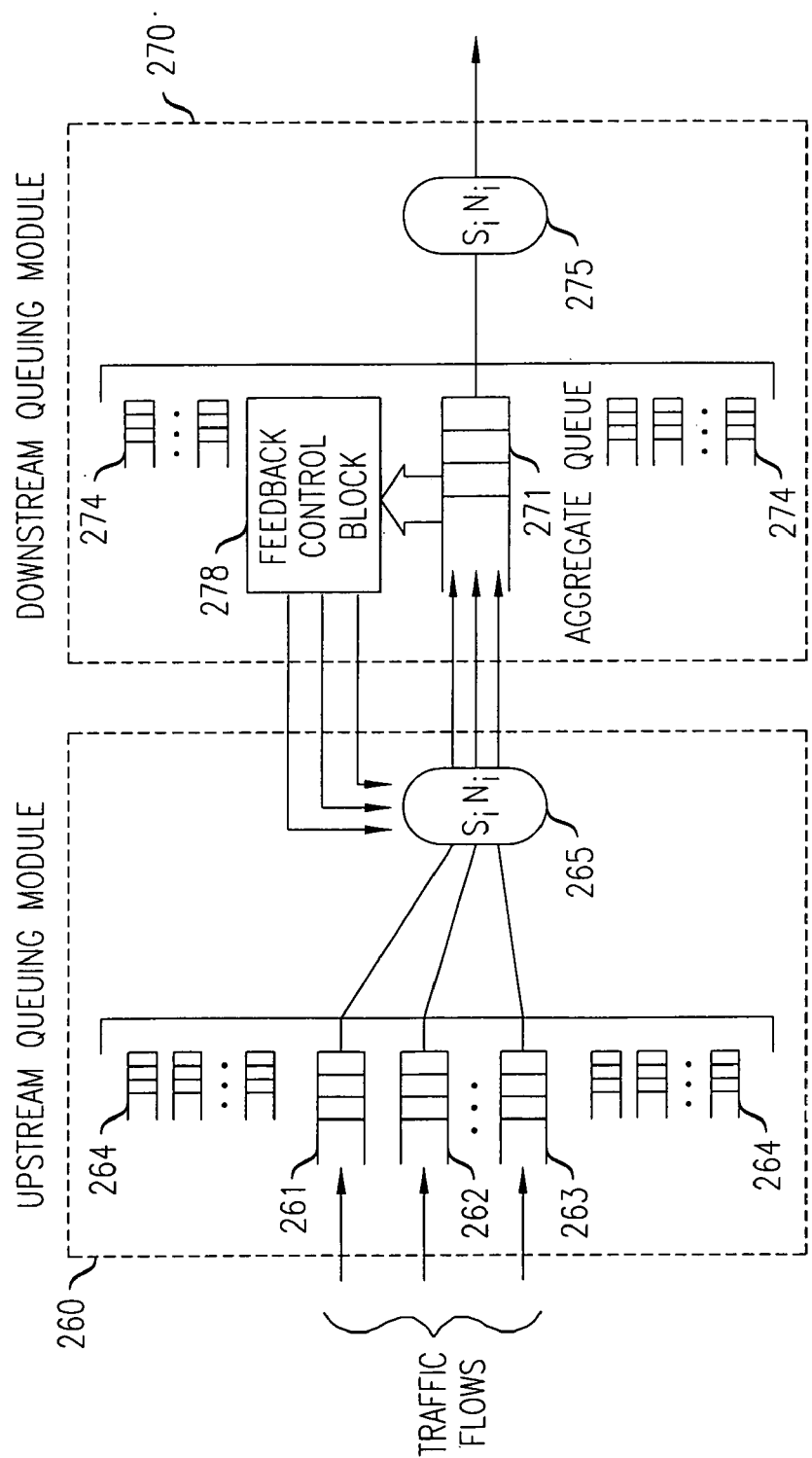
FIG. 7 illustrates a possible implementation of the credit-based feedback method in a two-stage switching system with in-channel flow aggregation.

Alternatively, the disclosed method is used to provide selective feedback for a set of in-channel flows sharing both upstream and downstream queuing modules, as shown in FIG. 7. In an upstream queuing module 260, a set of flows belonging to the same spatial channel are queued individually in queues 261, 262, 263. A plurality of queues 264 represents upstream cross-traffic flows. Scheduling node 265 provide high-granularity service its sessions, including the flows of the given spatial channel. In the downstream queuing module 270, the flows of the given spatial channel are aggregated in a common queue 271, which is served by the scheduler 275 along with other downstream cross-traffic flows, represented by plurality of queues 274. The feedback control block 278 monitors the state of the queue 271 together with its arrival and departure events according to the method disclosed in the foregoing presentation, and generates the per-flow backpressure signal to control the behavior of the upstream scheduler 265.

Figure 8:
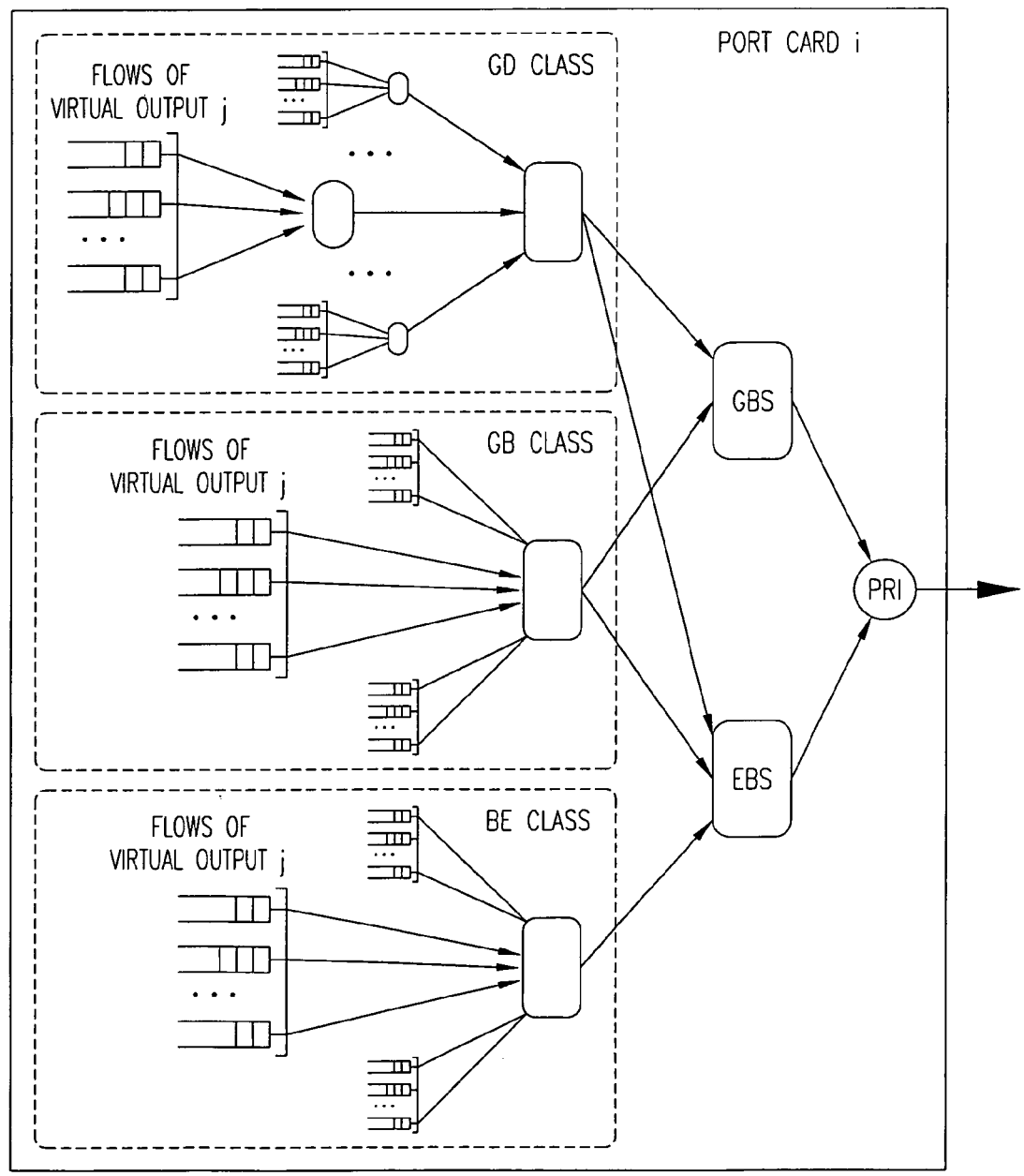
FIG. 8 illustrates an ingress port scheduling structure in a distributed scheduling architecture.
Figure 9:
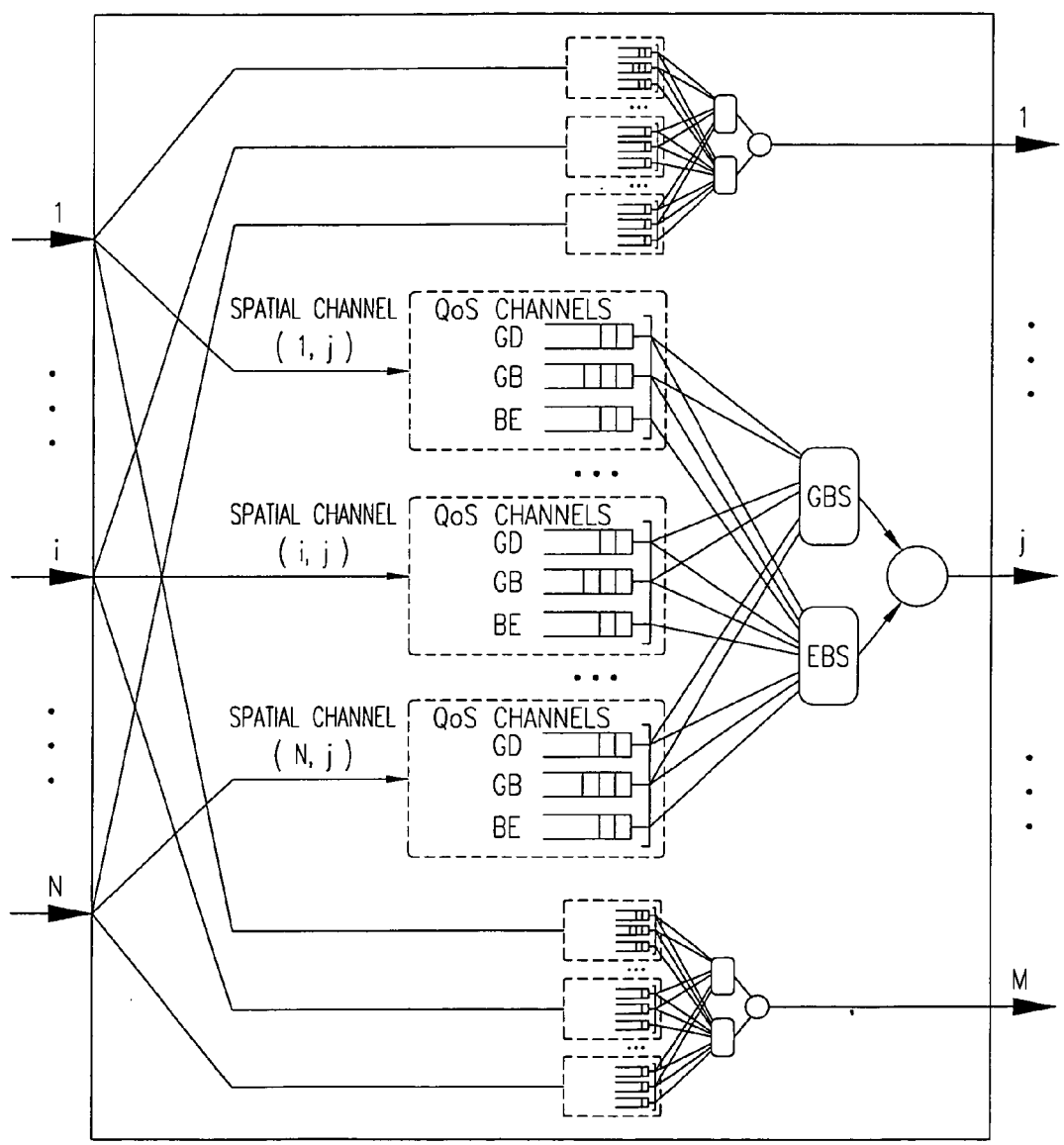
FIG. 9 illustrates a fabric scheduling structure in a distributed scheduling architecture.

In another embodiment, the feedback method described in this disclosure can be used to provide inter-stage interaction in a distributed scheduling architecture. A reference distributed switch contains ingress port card stage with large amount of buffers, switching fabric with moderate-size buffers, and the bufferless egress port card stage. The per-flow queuing and sophisticated weighted fair scheduling is performed primarily in the ingress stage. For the purpose of QoS provisioning, all traffic flows are classified as either Guaranteed Delay (GD), Guaranteed Bandwidth (GB) or Best Effort (BE). The port card scheduling architecture, which has a hierarchical structure with the top layer represented by the GBS and EBS scheduling pair, is shown in FIG. 8. In the switching fabric, the flows of a specific QoS class belonging to a specific spatial channel are aggregated in a common QoS channel queue. The QoS channel queues destined to the same fabric output are served by the same output port EBS/GBS scheduling pair, as shown in FIG. 9. The non-hierarchical scheduling structure with fewer number of queues fits the moderate buffering capacity of the switching fabric. The further reduction in the number of fabric queues can be achieved by aggregating the traffic of the GB and BE QoS classes within the same fabric queue, referred to as the Non-Guaranteed Delay (NGD) channel queue.

Figure 10:
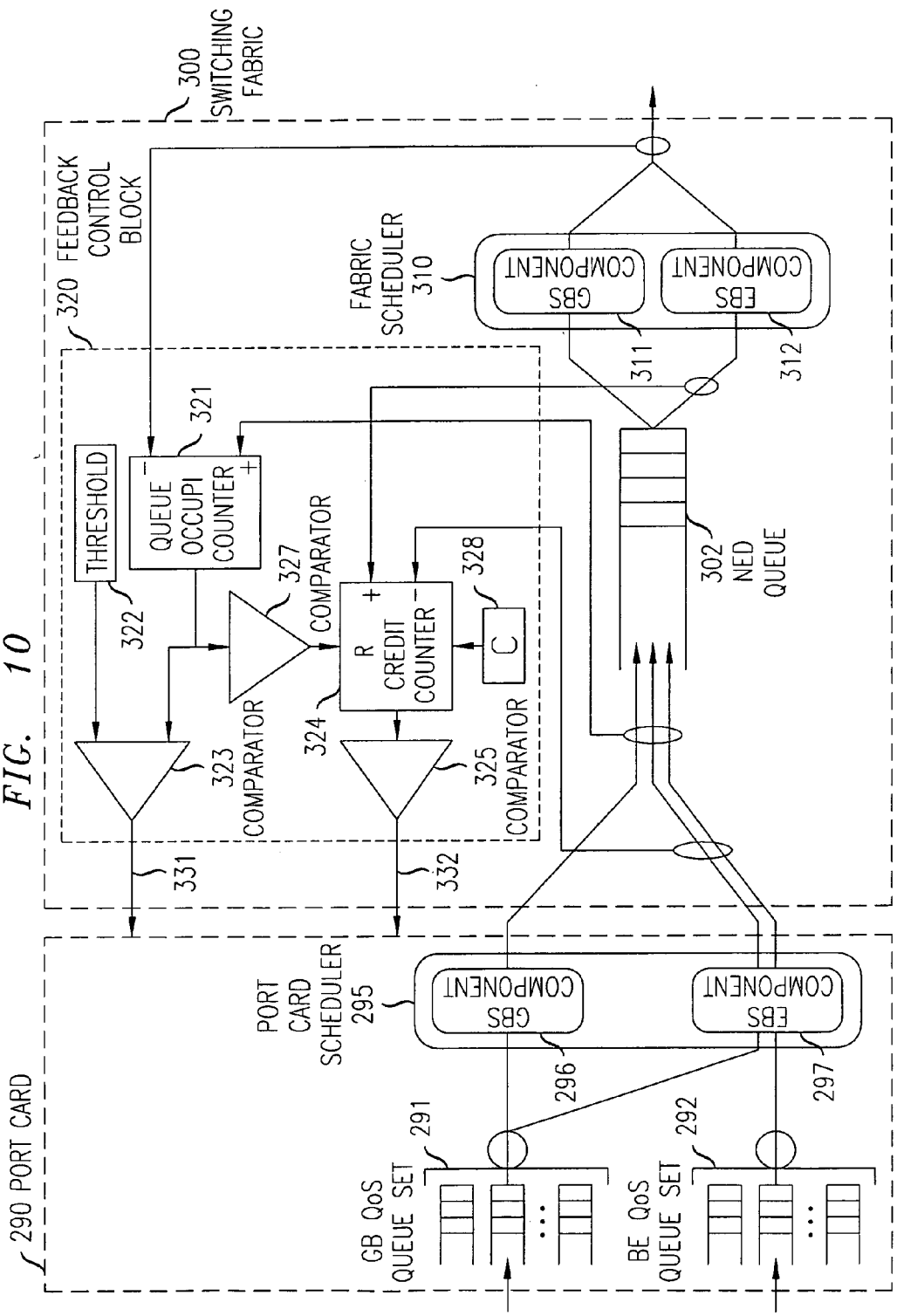
FIG. 10 illustrates a credit-based feedback mechanism for control of the Guaranteed bandwidth and Best Effort traffic components within a Non-Guaranteed Delay channel in a distributed scheduling architecture.

The aggregation technique employs the disclosed method and is based on the observation of the queue length and the EBS granted rates in the port card and the fabric. As there is no direct correspondence between GB and BE QoS channels, on one hand, and the GBS and EBS scheduling components, on the other, a modification of the disclosed method is required. The queue NGD channel feedback is composed of the two signals. A queue-length-based backpressure signal is asserted towards the corresponding port card, when the occupancy of the NGD channel queue exceeds a threshold, which can be either static or dynamic. The queue-length-based backpressure signal prevents the port card scheduler from serving flows of either GB or BE QoS classes. A credit-based backpressure signal is asserted when the EBS credit function in the fabric reaches or falls below zero. The credit function is set to the original value (pre-computed static or state-dependent dynamic) each time the occupancy of the NGD channel fabric queue reaches zero and is incremented, subject to truncation, on each EBS service that this queue receives. The credit increments may optionally be suppressed during the time intervals when the queue-length-based backpressure signal is asserted. The credit function is decremented each time a data unit served port card EBS scheduling component arrives to the fabric NGD channel queue. The arrival events may be optionally filtered (disqualified for the purpose of the credit function decrement) depending on the QoS class of the arriving item. FIG. 10 depicts the feedback mechanism for a selected spatial channel. Within the port card 290, the flows belonging to the GB QoS channel are queued in a queue set 291, whereas the flows belonging to the BE QoS channel, in a queue set 292. These flows are served by the port card scheduler 295, along with the cross-traffic flows. The GB flow aggregate of the given spatial channel may be selected by both the GBS component 296 and the EBS component 297 of the scheduler 295. The BE flow aggregate of the given spatial channel may be selected by the EBS component 297 only. In the switching fabric 300, both GB and BE flows are aggregated in an NGD queue 302 of the given spatial channel. NGD queue 302 is configured as a session in the fabric scheduler 310, which contains two components: the GBS component 311 and the EBS component 312. The feedback control block 320 associated with the NGD queue 302 contains a queue occupancy counter 321 and credit counter 324. The queue occupancy counter, which is initially set to zero, is incremented on the event of data item arrival into the queue 302; and is decremented on the event of data item departure from the queue 302. The value of the counter 321 is compared in the comparator 323 with a threshold provided by the threshold computation module 322. If the value of the counter exceeds the threshold, a backpressure signal 331 is asserted. Backpressure signal 331 is used in the port card 290 to prevent the scheduler 295 from selecting both GB and BE flow aggregates of the given spatial channel. Referring again to the feedback control block 320 of the fabric 300, the value of the counter 321 is compared with zero in comparator 327 to generate a reset signal to the credit counter 324. On each such reset event, an initial credit value provided by module 328 is written into the credit counter 324. Subsequently, the value of the credit counter 324 is incremented each time the NGS queue 302 is serviced by the EBS component 312 of the fabric scheduler 310, and is decremented when a data item serviced by the EBS component 297 of the port card scheduler 295 enters the NGD queue 302. The credit counter 324 may optionally skip increment events during the time intervals when the backpressure signal 331 is asserted. The credit counter 324 may optionally skip decrement events when the GB flow data item enters the NGD queue. The value of the credit counter 324 is compared with zero in comparator 325. Whenever the counter value is equal or less than zero, a backpressure signal 332 is generated. Backpressure signal 332 is used in the port card to prevent the scheduler 295 from selecting for service the BE flow aggregate of the given spatial channel.

Various additional modifications of this invention will occur to those skilled in the art and all deviations from the specific teachings of this specification that basically rely upon the principles and their equivalents through which the art has been advanced are properly considered within the scope of the invention as described and claimed.

What is claimed is:

1. A method of regulating traffic in a communications network comprising the steps of:
   aggregating one or more component traffic flows into a component traffic stream;
   aggregating a plurality of component traffic streams into an aggregate stream, wherein the plurality of component traffic streams comprises a Guaranteed Bandwidth Traffic Stream and a Best Effort Traffic Stream;
   carrying the aggregate stream in a single, FIFO queue; and
   generating selective backpressure on selected ones of the component traffic streams such that selected ones of the component streams are desirably regulated, wherein said generating selective backpressure comprises:
      asserting a first backpressure signal towards the Guaranteed Bandwidth Traffic Stream and the Best Effort Traffic Stream; and
      asserting a second backpressure signal towards the Best Effort Traffic Stream;
   said selective backpressure being generated in response to respective credit counters associated with said selected ones of the component traffic streams reaching a threshold level.

2. The method according to claim 1, wherein said aggregation of the one or more traffic flows is performed according to a destination of the traffic flows and the similarity of Quality of Service requirements of the traffic flows.

3. The method according to claim 1, wherein said aggregation of the one or more component traffic streams into said aggregate stream is performed according to a destination of the component traffic stream.

4. The method according to claim 3, wherein said aggregation is performed according to an absence of delay guarantees.

5. The method according to claim 1 further comprising the steps of:
   maintaining an aggregate queue occupancy counter;
   initializing the credit counter to a maximum value;
   decrementing the credit counter when an item of specific type arrives in the aggregate queue;
   incrementing the credit counter when the queue is given service granted to the specific type of traffic stream without regard to the type of data item which departs the single FIFO queue;
   truncating the credit counter at a specific maximum level; and
   resetting the credit counter to a maximum value when the aggregate queue occupancy counter falls to zero.

6. The method according to claim 1, wherein said backpressure generating step is performed when the credit counter reaches a value of zero.

7. The method according to claim 1, wherein each data item arrival and departure event can be associated with either guaranteed or excess bandwidth service provided by a corresponding scheduler.

8. The method according to claim 7, wherein the generating selective backpressure step further comprises the steps of:
   maintaining an aggregate queue occupancy counter; and
   maintaining a Best Effort credit counter.

9. The method according to claim 8, wherein said step of maintaining said Best Effort credit counter further comprises the steps of:
   initializing the Best Effort credit counter to a maximum value;
   incrementing the Best Effort credit counter when an excess bandwidth service is provided to said aggregate queue;
   decrementing the Best Effort credit counter when a data item arrival is associated with excess bandwidth service; and
   resetting the Best Effort credit counter to its maximum value each time said aggregate queue occupancy counter reaches a value of zero.

10. The method according to claim 9 wherein said incrementing step is not performed if the first backpressure signal is asserted.

11. The method according to claim 9 wherein said decrementing step is not performed if the arriving data item belongs to the Guaranteed Bandwidth Traffic Stream.

12. The method according to claim 8 wherein said step of asserting a first backpressure signal occurs whenever the aggregate queue occupancy counter exceeds a predefined threshold.

13. The method according to claim 8 wherein said step of asserting a second backpressure signal occurs whenever the Best Effort credit counter reaches a value of zero.

14. An apparatus for regulating traffic in a communications network comprising:
   means for aggregating one or more component traffic flows into a component traffic stream;
   means for aggregating a plurality of component traffic streams into an aggregate stream, wherein the plurality of component traffic streams comprises a Guaranteed Bandwidth Traffic Stream and a Best Effort Traffic Stream;
   means for carrying the aggregate stream in a single, FIFO queue; and
   means for generating selective backpressure on selected ones of the component traffic streams such that selected ones of the component streams are desirably regulated, wherein said means for generating selective backpressure comprises:
      means for asserting a first backpressure signal towards the Guaranteed Bandwidth Traffic Stream and the Best Effort Traffic Stream; and
      means for asserting a second backpressure signal towards the Best Effort Traffic Stream;
   said means for generating selective backpressure adapted for generating selective backpressure in response to respective credit counters associated with said selected ones of the component traffic streams reaching a threshold level.

* * * * *